Lee O. Heflinger
Robert E. Brooks
INVENTOR.

BY
ATTORNEY

United States Patent Office 3,523,054
Patented Aug. 4, 1970

3,523,054
DIFFUSING SCREEN FOR HOLOGRAPHIC CAMERA
Lee O. Heflinger, Torrance, and Robert E. Brooks, Redondo Beach, Calif., assignors to TRW Inc., Redondo Beach, Calif., a corporation of Ohio
Filed Feb. 9, 1968, Ser. No. 704,348
Int. Cl. B44f 1/04
U.S. Cl. 161—3.5                             10 Claims

ABSTRACT OF THE DISCLOSURE

A diffusing screen having refracting means for casting light passing therethrough into individual cells from a scene beam to correspond to cells from a reference beam on the photographic plate.

An improved holographic camera in combination with the diffusing screen described above.

BACKGROUND OF THE INVENTION

The invention relates to the field of holography and, more particularly, to a novel diffusing screen for a holographic camera. Holography (or lens-less photography) is based upon the recording of a photographic film or plate of a diffraction pattern created by the interference between light scattered from an object or scene that has been illuminated with coherent light and light directly impinging upon the film from the same source. The exposed film is then developed and, upon illumination with coherent light while positioned in the same geometric relation with respect to the film exposed, produces a diffracted beam which is a reconstruction of the original pattern scattered from the scene at the time of exposure.

As viewed, the reconstruction of the scene in the hologram is a true, virtual three-dimensional image whose perspective changes with the viewing angle. This virtual image can be examined and processed with conventional optical instruments such as microscopes, telescopes and copy cameras, with the result that the virtual image can be examined at leisure in various focal planes.

Diffusing screens permit a reconstruction that shows perspective as well as the ability to see around the reconstructed virtual objects. The prior art screens provide a wide cone of angles of the light passing therethrough that tend to destroy both the spatial and temporal overlap of the two interfering beams realized by the properly arranged and aligned holographic camera. For example, ground glass has been used as a diffusing screen and it has been found to scatter light over too wide an angle with the result that the light of one coherent cell is mixed with another coherent cell with which it does not interfere. Such a diffusing screen has the disadvtange that it cannot be moved very far away from the recording photographic plate and as a result, the photographic volume is reduced when lasers of limited coherence are used. The latter limited coherence causes the principal difficulty in making high-quality, pulsed laser holograms. Nevertheless, high-quality holograms of front- and back-lighted subjects can be made using the screens according to the invention in combination with a holographic camera by temporally and spatially matching the scene and reference beams generated by the laser.

SUMMARY OF THE INVENTION

The invention is comprised of a diffusing screen and such a screen in combination with a holographic camera. The screen is formed of a plurality of refracting members substantially surrounded by a refracting medium having an index of refraction different from that of the members. An object of the invention is to provide an improved diffusing screen and an improved holographic camera in combination with a screen according to the invention.

Another object of the invention is to provide a diffusing screen in which the scattering angle is controlled by the respective different indices of refraction of a plurality of diffracting members and a medium in which the respective members are substantially immersed or surrounded. The index of refraction for each can be chosen and thus screens of differing scattering angles can be made in a controlled manner.

Still another object of the invention is to provide a diffusing screen which scatters light over a narrow angular range. As a result, a minimum of light from one coherent cell or area of the beam is cast into other mutually exclusive neighboring cells; that is, there is a minimum of overlapping from one area into another. Light energy is thereby conserved and the depth of the photographic volume is increased.

A further object of the invention is to provide a diffusing screen in which light is cast over a narrow angular range, for example, $\pm 10°$.

Another object of the invention is to provide diffusing screens having the feature of producing scattered beams that are not characterized by a central hot spot.

The camera in which the screen, according to the invention, is a part of a combination thereof includes a laser source in which its beam is split into two beams. After splitting, the beams are directed along separate optical paths by means of mirrors to recombine at the film plane of a glass photographic plate. The beam transit time from the splitter to the film plane is substantially the same for each optical path and due to this arrangement, the two beams are superimposed on the film plane both in space and time. That is, the two interfering beams match at the film plane both spatially and temporally so as to provide a high degree of tolerance to spatial and temporal incoherence in the laser radiation and still produce a high quality hologram when a scene is adapted to be illuminated by one of the beams. The diffusing screen is placed in the optical path of the beam that is specifically adapted to illuminate the scene or object.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes.

BRIEF DESCRIPTION OF THE PREFERRED EMBODIMENTS

Figure 1:
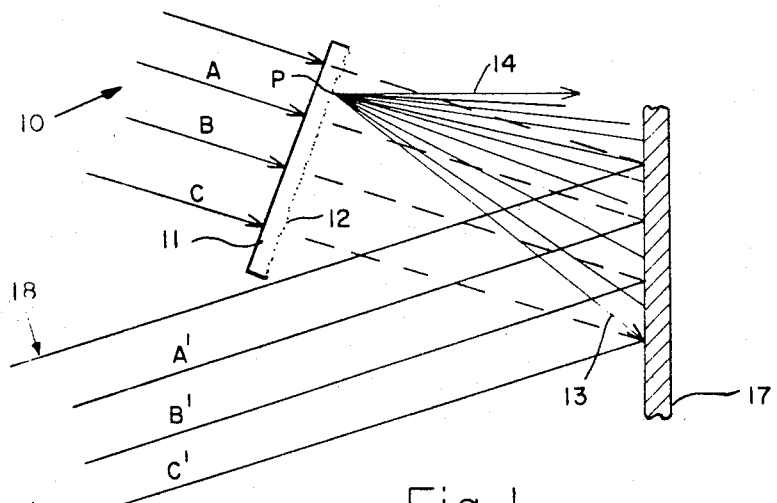
FIG. 1 is a schematic diagram illustrating the deleterious effect of a prior art diffusing screen on a hologram.

Referring again to the drawings, in FIG. 1 there is shown a scene beam, generally designated as 10, of coherent light produced by a laser and shown divided into three cells or areas of light, A, B and C. The cells are bounded by lines indicating rays of light passing through a prior art diffusing screen 11 made of glass and having a ground surface 12. Coherent light passing through a screen at a point P is shown to be diffused or scattered in the form of a wide angle cone having outer rays 13 and 14. The rays scatter beyond cell A in which they were originally traveling into continuations of cells B and C, the scattering being caused by the diffusing screen. The rays terminate on a photographic plate 17 which is being exposed to be made into a hologram.

A reference beam, generally designated as 18, produced by the same laser as the scene beam 10, is shown to be divided into cells A', B' and C', corresponding to the cells A, B and C, respectively. In a typical holographic camera, the light in cell A is caused to interfere with the light in cell A' and similarly, the light in cells B and C are adapted to interfere with the light in the rsepective cells B' and C'. Here the ground glass diffusing screen scatters light over too wide an angle, with the result that the light of one coherent cell A is mixed with the light of cells B and C and which, when traveling in cells B' and C', it does not interfere. Such a diffusing screen has a disadvantage and cannot be moved very far away from the recording plate, with the result that the photographic volume is reduced when lasers of limited coherence are used. Stated conically, the light in coherent cell A of the scene beam is cast into other coherent cells of the reference beam with which it cannot interfere.

Figure 2:
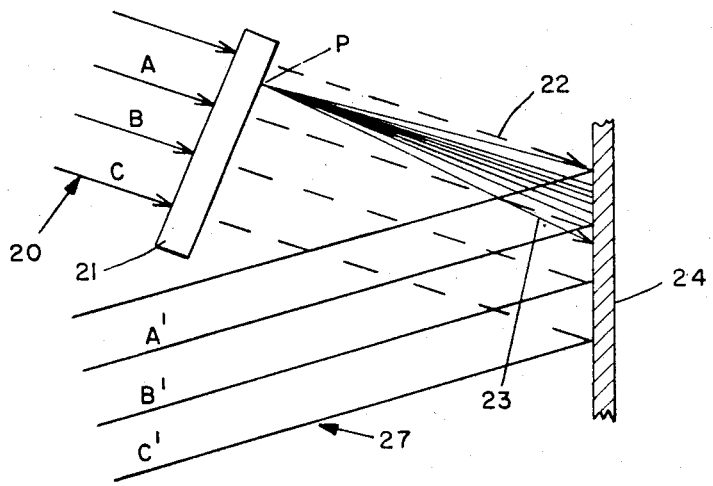
FIG. 2 is a schematic diagram illustrating the properties of a properly constructed diffusing screen, according to the invention.

In FIG. 2, a scene beam 20, composed of coherent cells A, B and C, is shown to pass through a diffusing screen 21, according to the invention. Here, light passing through a point P in the coherent cell A is scattered into a narrow cone having an annular range of approximately ±10°, the cone being bounded by outer rays 22 and 23. Again, the rays terminates on a photographic plate 24 being made into a hologram by the interference of the coherent light cells A', B' and C', forming a reference beam 27 from the same laser source as that of the scene beam 20. The light from the coherent cell A of the scene beam is cast only into the area of a corresponding cell A' of the reference beam and with which it properly interferes to form the hologram. Such a screen has the additional feature of producing a scattered beam which does not have a central hot spot.

Figure 3:
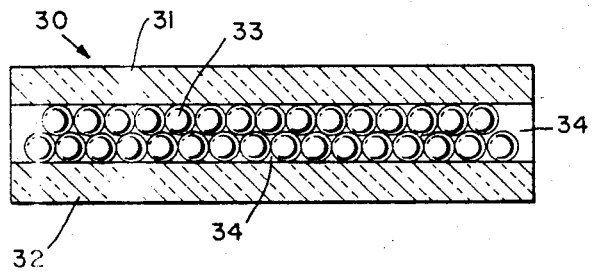
FIG. 3 is an end view of a diffusing screen according to the invention.
Figure 4:
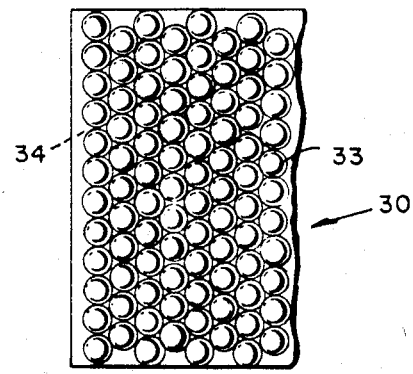
FIG. 4 is a fragmentary plan view of the screen shown in FIG. 3.

In FIGS. 3 and 4, there is shown an embodiment of the diffusing screen having the properties of the screen 21 shown in FIG. 2. Here, the screen, generally designated as 30, is generally rectangular in plan view. The screen is formed of two glass plates 31 and 32 which enclose two layers of glass beads 33 arranged in each layer in hexagonal close pack. The beads have a diameter in the range of 0.2 to 1 millimeter. The intervening spaces between the leads and generally between the glass plate covers are filled with an epoxy, for example, or other clear cement 34. Each head is substantially completely covered with the cement.

A diffusing screen thus made has a scattering angle controlled by the index of refraction of the filling cement and the index of refraction of the beads, the two being different. Since each can be chosen, screens having a different scattering angle can be made so as to control the latter angle. Glass or plastic are selected because of its stability. The index of the medium, cement, may be more or less than that of 1.5, which is the index of refraction of glass. For example, in a screen in which the beads would be sealingly enclosed, a liquid such as water, having an index of 1.3, could be used. Since the ratio of the indices of refraction determines the scattering angle, it can be controlled by proper selection of the ratio of the indices of refraction. More than two layers of beads also can be used if desired.

Figure 5:
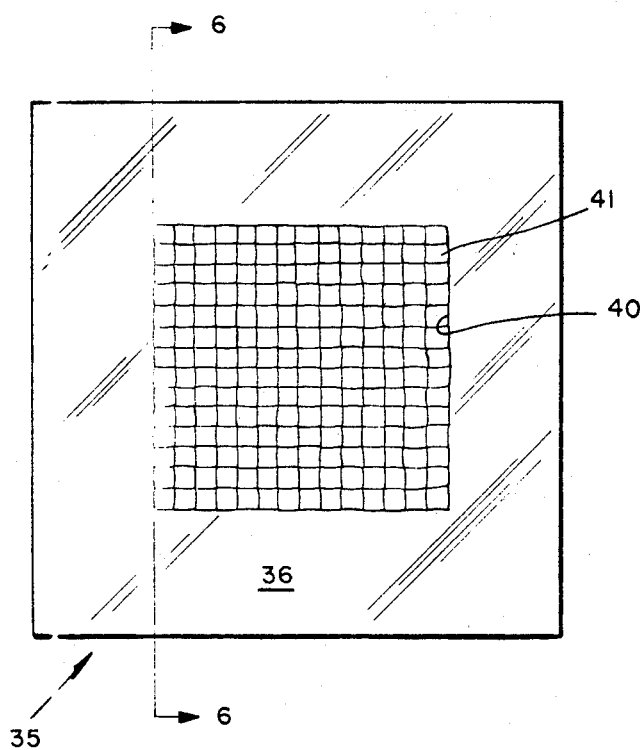
FIG. 5 is a plan view of another embodiment of the invention.
Figure 6:
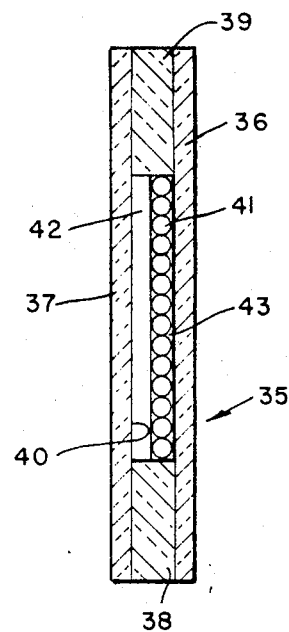
FIG. 6 is a partially cross-sectional view, taken along the lines 6—6 in FIG. 5.

In FIGS. 5 and 6, another embodiment of the invention is illustrated. The screen here, generally indicated as 35, is also shown to be rectangular and has two outer glass plates 36 and 37, and has side and end plates, as 38 and 39, to form an external seal along with the plates 36 and 37. In a rectangular cavity 40, there are two layers of cylindrical glass rods 41 and 42. The rods 41 are arranged in juxtaposition and are at right angles to the direction of the rods 42, also arranged in juxtaposition. The cavity 40 is further filled with a liquid 43, for example, water, filling the spaces between the rods and the outer plates and in substantial contact with each of the rods.

In plan view, looking into the rods, their crossing provides the appearance of a multiplicity of mosaic lenses. Since the water has an index of refraction of 1.3 in contrast to 1.5 of that of the glass, there is a definite reduction in the scattering of light that passes through the screen as a result of the differences of the two indices of refraction so as to provide a controlled and narrow scattering of light in the form of the cone as shown in FIG. 2.

Figure 7:
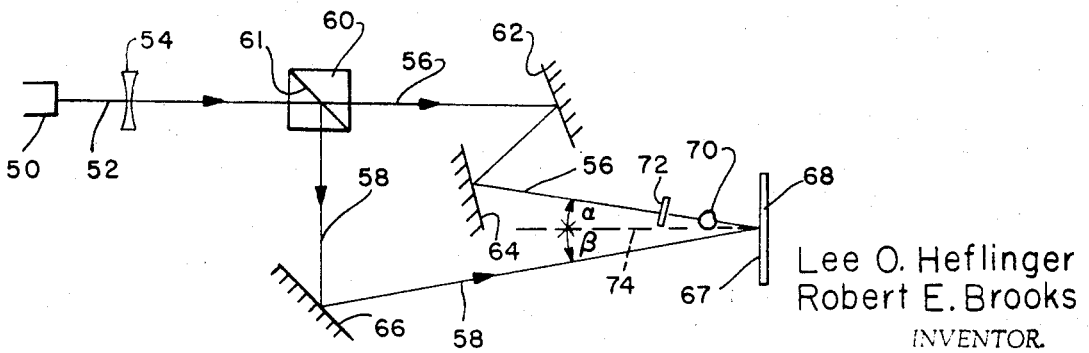
FIG. 7 is a schematic view of a halographic camera, shown in combination with a diffusing screen according to the invention.

In FIG. 7, there is shown a holographic camera capable of producing high quality two-beam holograms with the light from a quasi-coherent source, such as a pulsed solid state laser indicated at 50. This camera can be employed to photograph high speed events, such as bullets in flight, using radiation from a 60 nanosecond duration Kerr switched ruby laser system or the like. The output beam 52 of the laser is made divergent by a diverging lens 54. The beam 52, illustrated as a single central ray for simplicity, is split into a first or scene beam 56 and a second or reference beam 58 by a transparent cubical beam splitter 60. The beam splitter has a beam splitting surface 61, partially silvered so that the beam 52 is split to form the beam 56, passing through the surface 61, and the beam 58 reflected from the surface 21, both beams being substantially equal in intensity.

Mirrors 62, 64 and 66 serve to recombine the two split beams 56 and 58 at the film plane 67 of a photographic plate 68. A scene or object 70, to be photographed, is placed in the scene beam 56. A diffuser screen 72 of the type 30 or 35, as shown in FIGS. 3–4 and 5–6, respectively, is positioned in the scene beam between the scene and the mirror 64, so that the beam passes through the bead or rod portions as shown in the diffusing screens 30 and 35, for example.

The mirrors 62, 64 and 66 are arranged and positioned so that the two beams 56 and 58 undergo the same number of reflections along substantially equidistant optical paths in traveling from the surface 61 of the beam splitter to the film plane 67. This provides a super-imposition of the two beams 56 and 58 at the film plane 67 in both space and time. Failure to provide equal numbers of reflections along equidistant paths for the beams 56 and 58 results in the production of inferior holograms when illuminated with a light from a pulsed ruby laser. Further improvement of the quality of the holograms produced is obtained by arranging the mirrors 62, 64 and 66 so that the two beams 56 and 58 form substantially equal angles $\alpha$ and $\beta$ with a plane 74 positioned normal to the film plane 67, thus providing matching of the beams in a direction transverse to the film plane.

The use of the diffusing screen 72 provides illumination of the object, as 70, over wider angles, with the result that a reconstruction of the hologram provides perspective as well as the ability to see around the reconstructed virtual object. The use of a prior art diffusing screen, such as in the form of ground glass shown in FIG. 1, tends to destroy the spatial matching, since such a screen splits each ray of the scene beam into many rays over a wide angle as shown in FIG. 1. In holograms made with a diffusing screen, according to the invention, bright reconstructions are obtained because such diffusing screens scatter light at relatively narrow angles as shown in FIG. 2, thus restricting or substantially eliminating spatial mismatching.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described as being merely by way of example. We do not wish to be restricted to the specific forms shown or uses mentioned, except as defined by the accompanying claims, wherein various portions have been separated for clarity of reading and not for emphasis.

We claim:

1. A light diffusing screen for diffusing a light beam passing therethrough and particularly adapted for holographic apparatus, said screen comprising:
   (a) a plurality of transparent refracting elements, said elements being arranged in two layers disposed one behind the other with respect to the light beam passing therethrough, and each element forming a lens having a selected finite focal length;
   (b) a transparent medium surrounding said elements, said medium having an index of refraction different from that of said elements and said indices of refraction being selected so that each elemental area of said screen refracts light in a cone having a predetermined angle; and
   (c) means for maintaining said refracting elements and said medium in predetermined relationship.

2. A light diffusing screen as defined in claim 1 wherein said elements are of glass.

3. A light diffusing screen as defined in claim 1 wherein said transparent medium consists of a transparent liquid.

4. A light diffusing screen as defined in claim 1 wherein said transparent medium consists of a clear cement.

5. A light diffusing screen as defined in claim 1 wherein said reflecting elements consists of glass beads of substantially spherical shape packed in two adjacent layers.

6. A light diffusing screen as defined in claim 5 wherein said transparent medium consists of a clear cement.

7. A light diffusing screen as defined in claim 5 wherein said means for maintaining includes two substantially parallel glass plates enclosing said two layers of glass beads.

8. A light diffusing screen as defined in claim 2 wherein said elements consist of glass rods of substantially cylindrical cross section, the glass rods of one layer being disposed substantially at right angles to the glass rods of the adjacent layer, said glass rods being in contact with each other, whereby said glass rods form cylindrical lenses having a finite focal length.

9. A light diffusing screen as defined in claim 8 wherein said means for maintaining includes two substantially parallel glass plates enclosing said layers of glass rods.

10. A light diffusing screen as defined in claim 1 wherein said predetermined angle of said light cones is approximately ±10° as viewed in a focal plane of the scattered light.

References Cited

UNITED STATES PATENTS 2,213,077   8/1940   Schwartz _____ 350—126
2,589,014   3/1952   McLeod.

OTHER REFERENCES

Brooks et al.: IEEE Journal of Quantum Electronics, vol. QE–2, No. 8, pp. 275–279 (August 1966).

DAVID SCHONBERG, Primary Examiner

R. L. SHERMAN, Assistant Examiner

U.S. Cl. X.R.

350—3.5